Jan. 18, 1938. J. J. O. RULIANCICH 2,105,846
RADIAL ENGINE
Filed Nov. 19, 1934 7 Sheets-Sheet 3

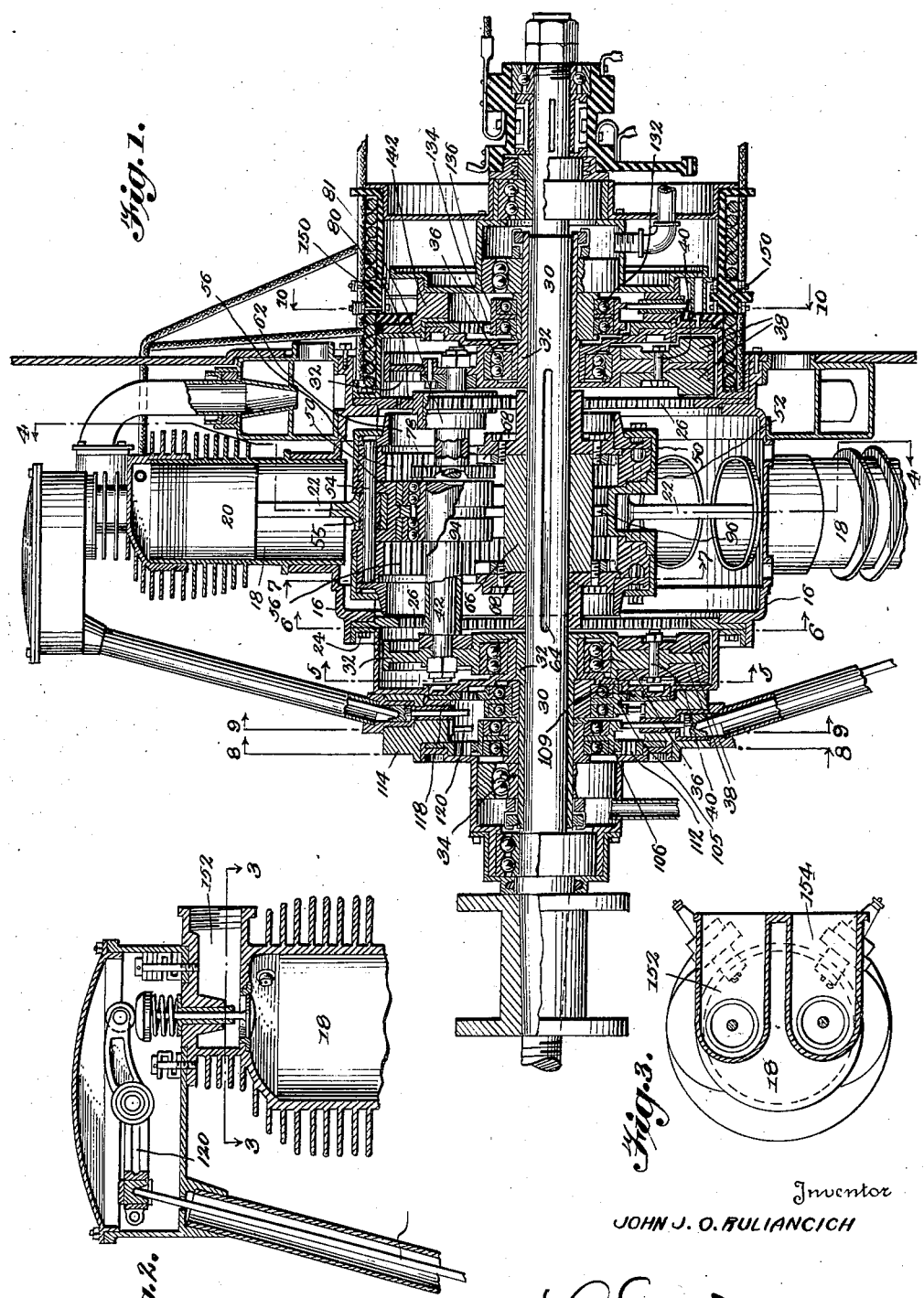

Inventor
JOHN J. O. RULIANCICH

Attorney

Jan. 18, 1938.　　　J. J. O. RULIANCICH　　　2,105,846
RADIAL ENGINE
Filed Nov. 19, 1934　　　7 Sheets-Sheet 4

Inventor
JOHN J. O. RULIANCICH

L. Edw. Flaherty
Attorney

Jan. 18, 1938.  J. J. O. RULIANCICH  2,105,846
RADIAL ENGINE
Filed Nov. 19, 1934   7 Sheets-Sheet 5

INVENTOR
JOHN J. O. RULIANCICH

Jan. 18, 1938.  J. J. O. RULIANCICH  2,105,846
RADIAL ENGINE
Filed Nov. 19, 1934  7 Sheets-Sheet 6
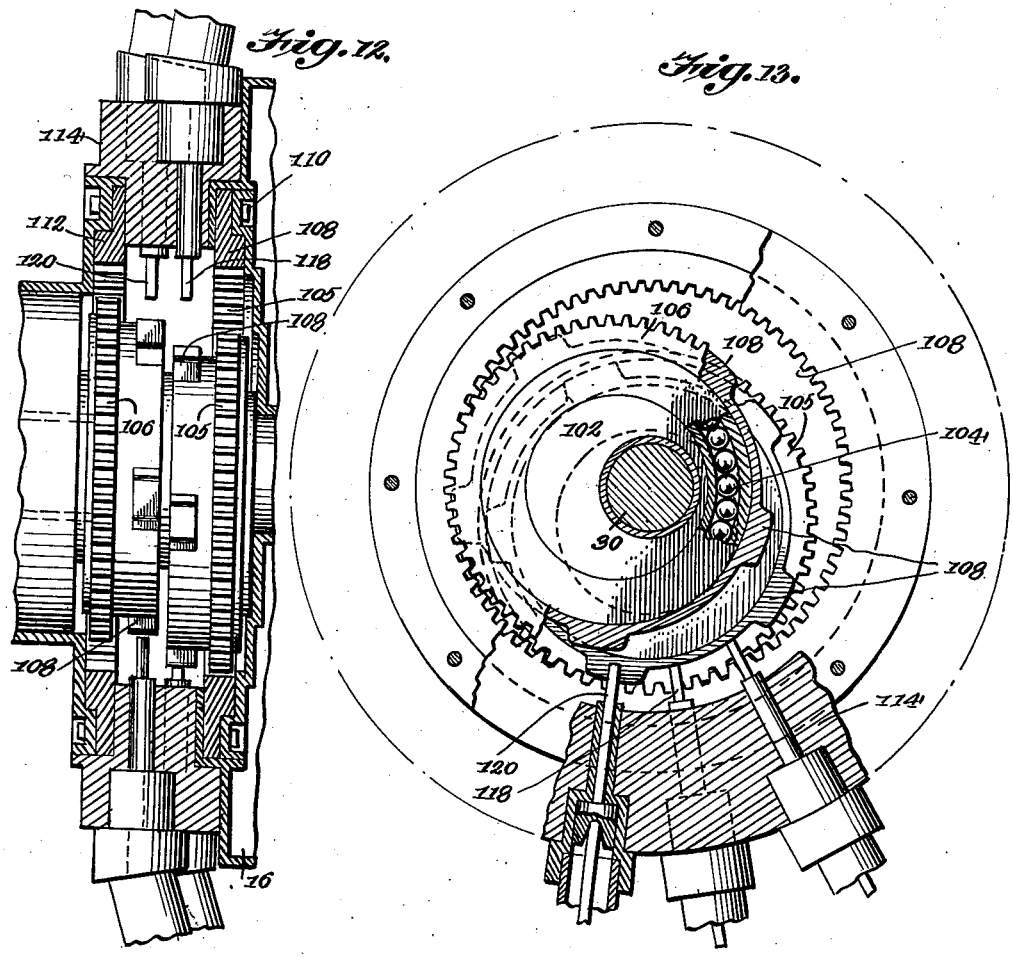
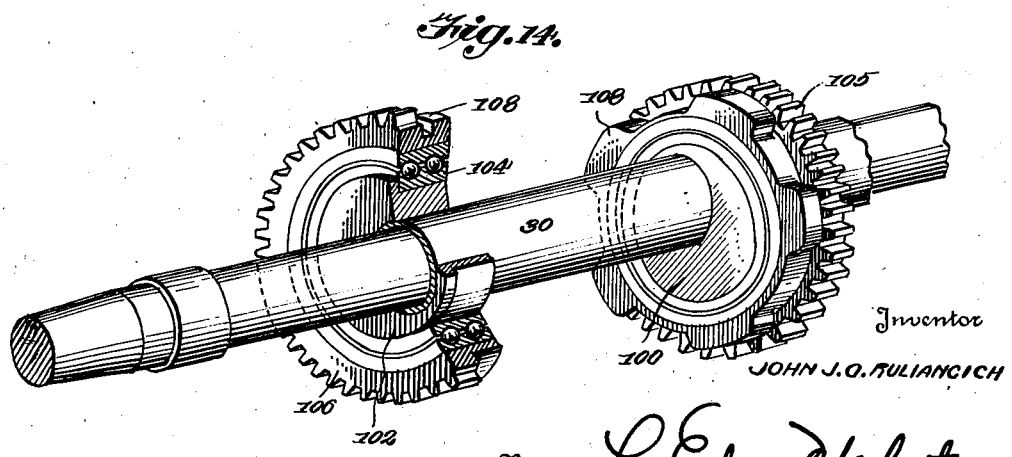

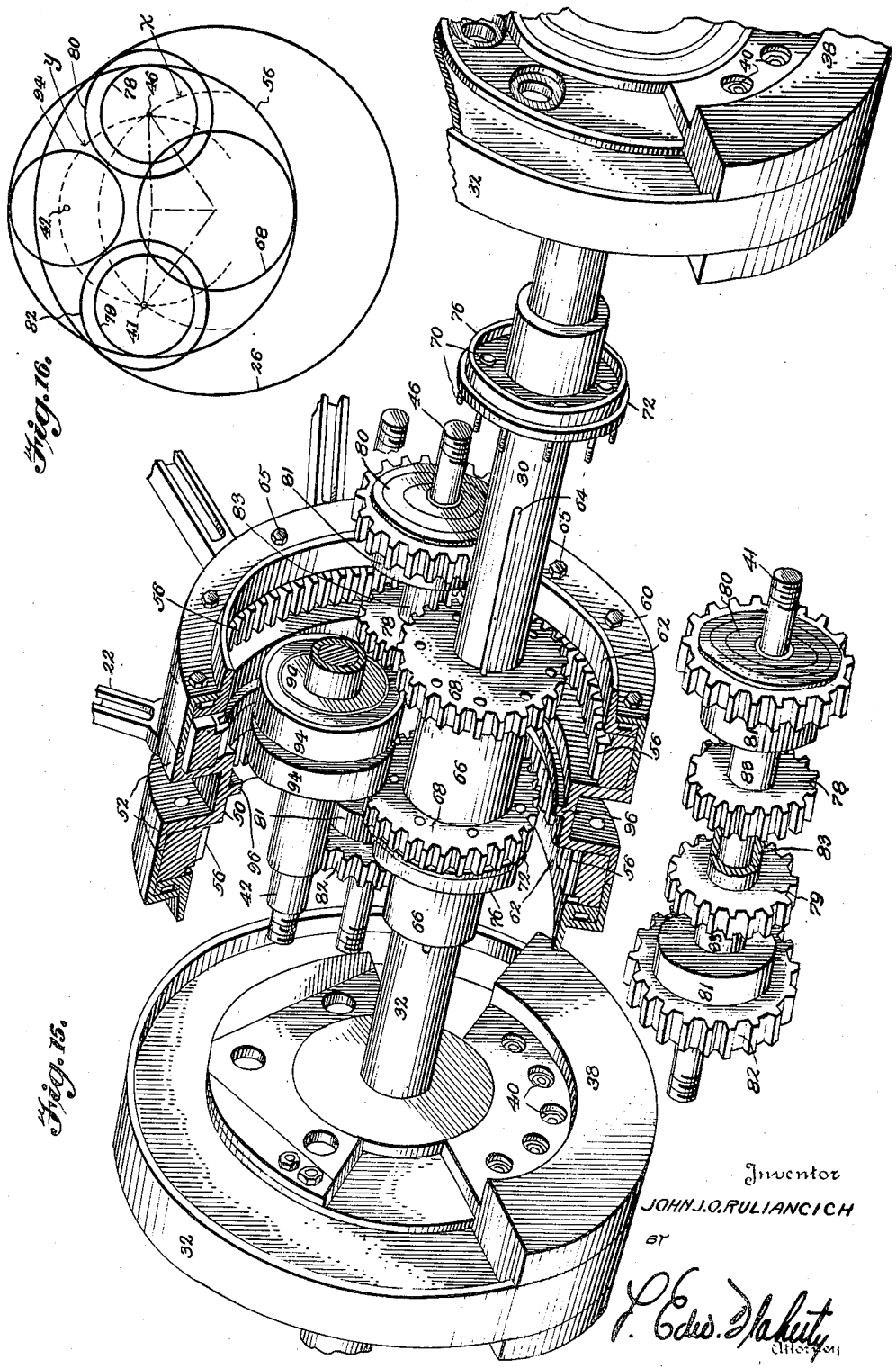

Patented Jan. 18, 1938

2,105,846

UNITED STATES PATENT OFFICE 2,105,846

RADIAL ENGINE

John J. O. Ruliancich, New Kensington, Pa., assignor to Fred Golden, New Kensington, Pa.

Application November 19, 1934, Serial No. 753,738

6 Claims. (Cl. 121—120)

The present invention relates to an internal combustion engine, and more particularly to internal combustion engines especially adapted for aeroplanes.

Internal combustion engines, of the radial type, are for the most part widely used in aeroplanes, due to the fact that the radial engine can be made lighter in weight for a given cylinder displacement and still possess the reliability and low cost of manufacturing.

The present type of radial engine now used has many disadvantages. For example the complicated articulated rod or master connecting rod constitutes such an unbalanced mechanism that the engines if run from 20 to 40 percent overspeed will have a short period of life. The size of the cylinders employed has now reached the largest practical limits, and consequently a limit has been reached as to the amount of power obtainable when running at low speed.

Appreciating the necessity for increased power, greater volumetric efficiency, less weight in pounds per horse power, and greater reliability it is one of the objects of the present invention to provide a radial engine with an increased number of cylinders which by virtue of its novel construction will efficiently operate at higher speeds and will accomplish all of the aforementioned desirable features.

Another important object of the present invention is to eliminate the master connecting rod and the heavy crank shaft used in the present type of radial engines and replace the same with a new and balanced mechanical structure which is lighter and stronger and capable of operating at the high speed desired of such engine.

A still further important attribute of the invention is to provide a novelly constructed radial engine, in which the size of the cylinders is reduced, the number thereof being increased with the end in view of obtaining a greater cooling capacity per cubic inch of piston displacement.

Another important object of the invention is to provide a radial engine in which the same structure for transforming reciprocating motion into rotary motion is employed for obtaining the necessary reduction of speed for the propeller shaft thereby eliminating the necessity of employing a separate gear reduction mechanism as is necessary in the present type of radial engine, and consequently reducing the total engine weight.

A still further important object of the invention will be found to reside in the novel construction, and operation wherein the shaft is straight and continuous without the necessity of breaking the same to incorporate the gear reduction mechanism now used in the present structure of radial engines.

Another important object of the invention will be found to reside in the novel valve operating arrangement.

Other improvements including simplicity, and low cost of manufacture will become apparent from a reading of the following description.

Briefly the present invention contemplates the provision of a non-rotating annular ring gear having the connecting rods of the radially disposed pistons pivotally mounted thereon. This annular ring gyrates around a pinion on the main central shaft of the engine. The teeth on the inner side of the annular ring engage the teeth of the pinion, thus converting the reciprocating motion of the pistons into the rotary motion of the shaft, and at the same time providing means for obtaining a reduced and efficient propeller shaft speed. The constraining motion of the gyrating annular ring gear is caused by blank and tooth pinions on the idling shafts. The idling shafts are securely fastened to counterweighted disks which rotate with the ring gear. The counterweighted disks are provided with hollow sleeves through which there extends the central shaft of the engine. The valve operating and ignition timing mechanism is accomplished through the medium of eccentrics which are actuated by hollow sleeves of the counterweighted disks.

In the accompanying drawings wherein corresponding parts are designated by similar reference numerals throughout.

Figure 1 is a fragmentary vertical sectional view of the engine.

Figure 2 is a detail vertical sectional view of the valve in head actuating means.

Figure 3 is a horizontal sectional view of Figure 2 taken on line 3—3 thereof looking in the direction of the arrows.

Figure 12 is a side elevational view partly in section of the valve actuating cams.

Figure 13 is a detail sectional view of the valve actuating cams and associated parts thereof.

Figure 14 is a separated perspective view of the valve actuating cams and gears, and Figure 15 is a separated sectional perspective view of the rotating frame and associated gears and counterweights.

Figure 16 is a diagrammatic view of the paths taken by the gearing shown in Figure 15.

Figure 4:
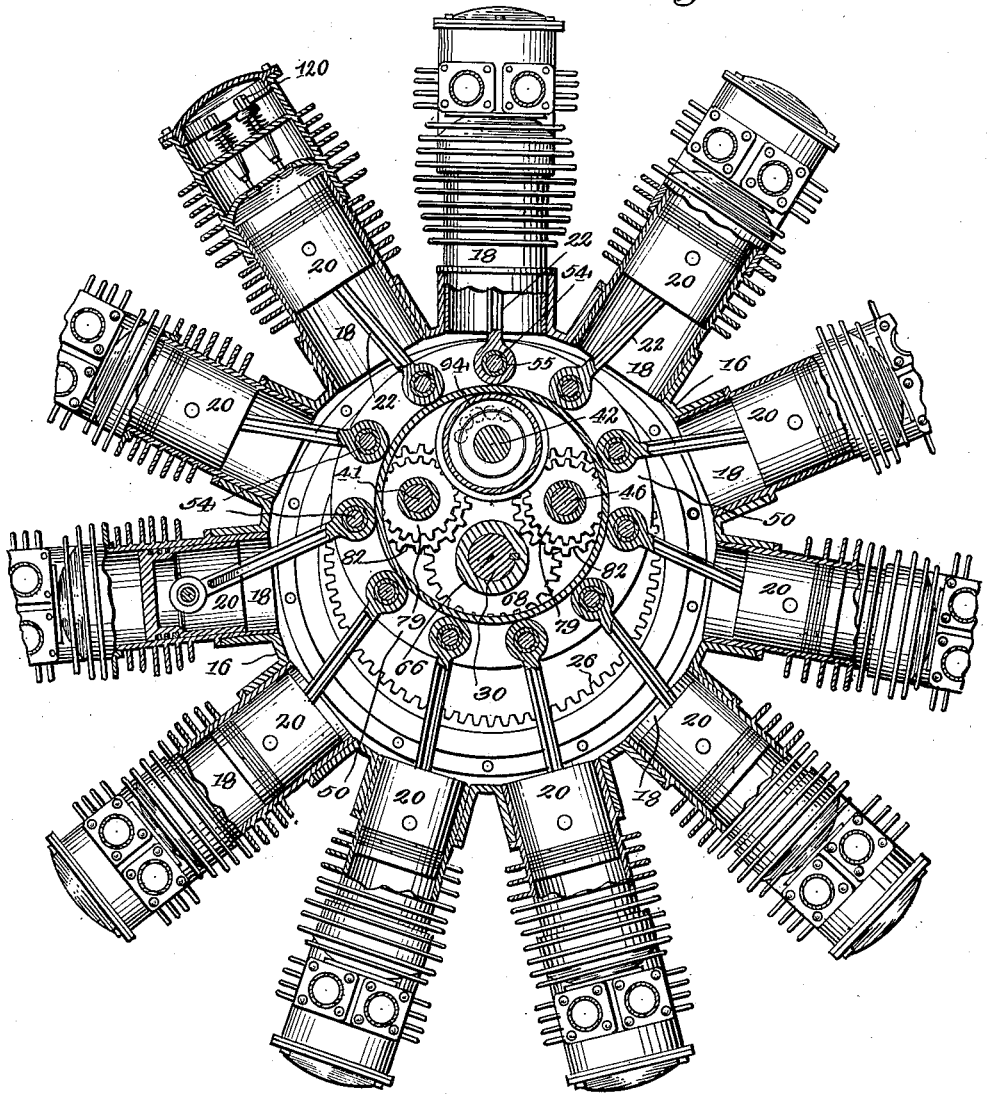
Figure 4 is a vertical sectional view of Figure 1 taken on line 4—4 thereof.
Figure 5:
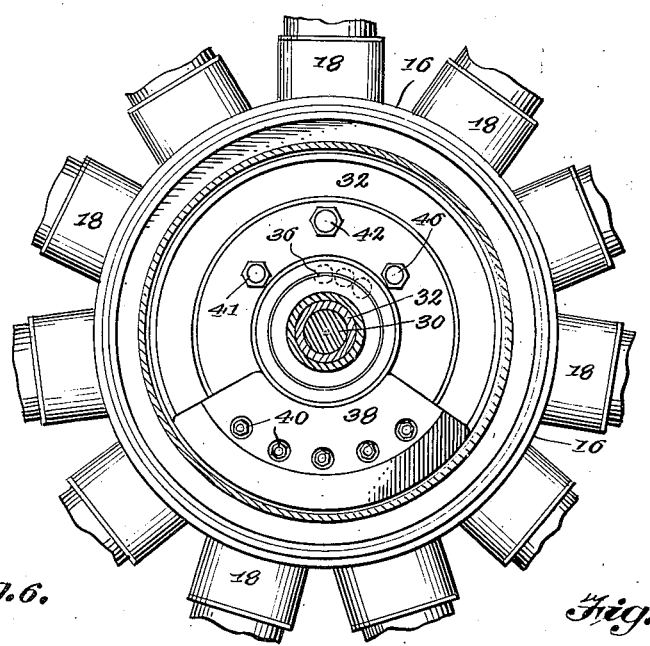
Figure 5 is a vertical sectional view of Figure 1 taken on line 5—5 thereof.
Figure 6:
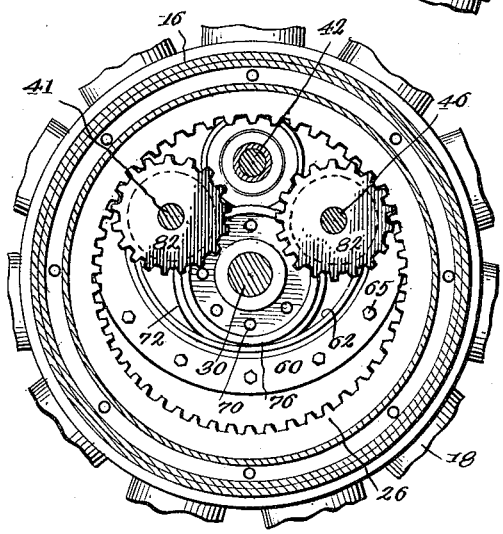
Figure 6 is a vertical sectional view of Figure 1 taken on line 6—6 thereof.
Figure 7:
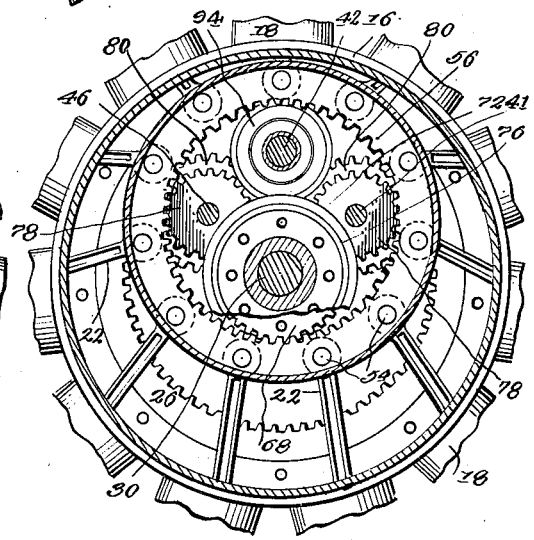
Figure 7 is a vertical sectional view of Figure 1 taken on line 7—7 thereof.

In the accompanying drawings wherein for the purpose of illustration there is shown a preferred embodiment of the invention, the reference numeral 16 generally designates the casing of the internal combustion engine, which is provided with a plurality of radial cylinders 18 secured therein in any manner. In the present construction of the engine the casing is provided with eleven cylinders, each cylinder having a slidable piston 20 with the usual connecting rod 22. To the annular casing 16 on each side thereof there is fixedly secured by means of bolts 24 an annular gear 26 which, as clearly illustrated on the drawings, is toothed on the inner periphery thereof.

Adjacent each annular gear 26 on the outer side, there is rotatably mounted on the main shaft 30 rotating frames or disks 32, each of the frames 32 being provided as clearly illustrated in Figure 1 with integral outwardly extending sleeve portions 34 through which the main shaft 30 of the engine extends. The rotating frames 32 are provided with the usual ball bearing 36. As clearly illustrated in Figures 1 and 15 each rotating frame or disk 32 has securely bolted thereto counterbalancing weights 38. These counterbalancing weights 38 as clearly illustrated are disposed on each side of the rotating disks and securely fastened thereto by means of the bolts 40.

These rotating frames or disks 32 are securely fastened together by means of three bolts or countershafts 41, 42 and 46. As clearly illustrated in the drawings the free ends of these bolts are secured in apertures in the rotating disks in that portion thereof opposite to the counterweights. The main central bolt or pin 42 is at a slightly greater radial distance from the axis of the engine than the other two bolts or pins 41 and 46.

Referring now to Figures 1 and 15 it will be seen that within the central portion of the casing 16 between the rotating disks there is provided a floating circular frame 50. This frame is of U-shape in vertical cross section as clearly illustrated having laterally extending side portions 52 defining an annular channel in which the free ends of the connecting rods 22 are provided with suitable bearings 55. Adjacent each upstanding side of the circular frame 50 are annular gears 56. The gears 56 are provided with spaced apertures, and are securely fastened to the sides of the frame 50 through the medium of the annular ring 60 which is of L-shape in vertical cross section. As clearly illustrated in Figures 1 and 15 a ring 62 which is similarly of L-shape in vertical cross section has its depending portions interposed between the outer side of each ring 56 and the ring 60 and is securely held in position by means of the bolts 65 which extend through the ring 62, the ring gears 56, and the side of the frame 50.

As clearly illustrated in Figures 1 and 15 the main shaft 30 is provided with a longitudinally extending key slot 64 to which there is keyed in the usual manner the sleeve 66, the sleeve having on each end thereof integral pinions 68 which engage the teeth of the ring gears 56 disposed and secured in the frame 50. The pinions 68 have securely fastened to the outer side thereof by means of the bolts 70 disks 72 which are provided with integral outwardly extending flanges defining circular rollers 76 the free end thereof terminating short of the inner side of the rotating disks 32. As clearly illustrated these rollers 72 secured to the pinion gear 68 ride upon the annular rings 62.

On each countershaft 41 and 46 there is rotatably mounted a set of integral gears. This set of gears includes outer large gears 80 and 82 of the same number of teeth and pitch and spaced inner gears 78 and 79 connected by means of the sleeves 83. To the inner side of each gear 80 and 82 there is provided an integral roller 81 of a diameter smaller than the diameter of its associated gear.

It will be observed that the gears 80 and 82 are of the same size and have the same number of teeth and engage the teeth of the stationary ring gears 26 in the casing 16, their integral rollers riding upon the inner surface of the rings 62.

The inner gears 78 and 79 likewise are of the same size, have the same number of teeth and engage the teeth of the ring gears 56 in the floating frame 50.

On the centrally located rod or countershaft 42 there is rotatably mounted on roller bearings 90, a pair of spaced integral rollers 94 which ride upon the inner side of the frame 50 between the inwardly extending projection 96.

Referring to Figure 15 it will be seen that there is geometrically illustrated the manner in which the relative positions of the pins 41 and 46 are located. The pins 41 and 46 are located at the intersections of the X and Y orbits, these intersections being computed in the following manner. In order to obtain the radial distance of pins 41 and 46 from the central axis or main shaft it is necessary to obtain the pitch diameters of the internal gears 56 and 26 and subtract from one of these diameters the diameter of the gears 82 and 80. For example if the diameter of the gear 26 is 6¼ inches and the diameter of gear 82 or 80 is 2¼ inches, subtracting the same will give four inches for the diameter of the orbit X, or a distance of 2 inches of radius from the central axis.

Now subtracting the pitch diameter of gear 79 or 78 from the eccentric ring gear pitch diameter will give the diameter of the Y orbit. If the diameter of the ring gear 56 is 5 inches and the diameter of the gear 79 or 78 for example, one and eight-tenth inches subtracting the same will give three and two-tenth inches for the diameter of orbit Y. Inasmuch as the orbit Y is eccentric to the orbit X the points of intersections of the two orbits indicate the radial positions of pins 41 and 46 from the central axis of the engine.

The ring gear 56 is maintained in its eccentric position, by means of the roller 94 and the teeth of all of the gears combined and by the centrifugal force of the eccentric ring gear itself.

The centrally located gyrating body 50 as will be observed is eccentrically mounted, its eccentric movement being limited by the rings 62, the engaging rollers 76 of the gears 68 and the rollers 81 of the gears 80 and 82. The pitch of these rollers fixing the eccentric limit of the body.

From the foregoing description, it will be clearly seen that upon a reciprocating movement of the pistons in their respective cylinders, the movement thereof is imparted through the connecting rods to the pivotally connected centrally disposed body causing the same to float and gyrate the annular gears 56 affecting a rotation of the gears 78 and 79 and the pinions 68 on the main shaft. Upon rotation of the gears 78 and 79 there is effected a rotation of the pinions 80 and 82 connected thereto and the engagement of these gears with the stationary annular gear immediately takes up the reaction of the torque against the central axis or main shaft of the engine. As the central body begins to rotate or gyrate in the direction desired, through the movement imparted by the pistons, the central shaft will rotate in the opposite direction thereof at a reduced speed. In the present embodiment of the invention, the stationary gears 26 fixedly secured to the casing each have 50 teeth of four pitch. The gears 80 and 82 are respectively provided with eighteen teeth of four and five pitch. The gear 56 has fifty teeth of five pitch and gear 68 twenty-eight teeth of five pitch and the rollers 76 and 81 and rings 62 are of five pitch. It will thus be seen that this gear ratio will produce one revolution of the central shaft for every one and four-sevenths of a complete gyration of the central body. Obviously the gear ratio may be changed and the reduction may be made to any limit desired.

It is apparent that there will be an equal symmetry in the oscillation of the connecting rods pivotally mounted to the gyrating centrally disposed body and a perfect dynamic balancing of the moving masses may be effected by the counterweights 38 secured to the rotating disks 32. By virtue of the novel gear arrangement, there is effected a considerable reduction in the size of the casing, thereby reducing the frontal area.

Figure 8:
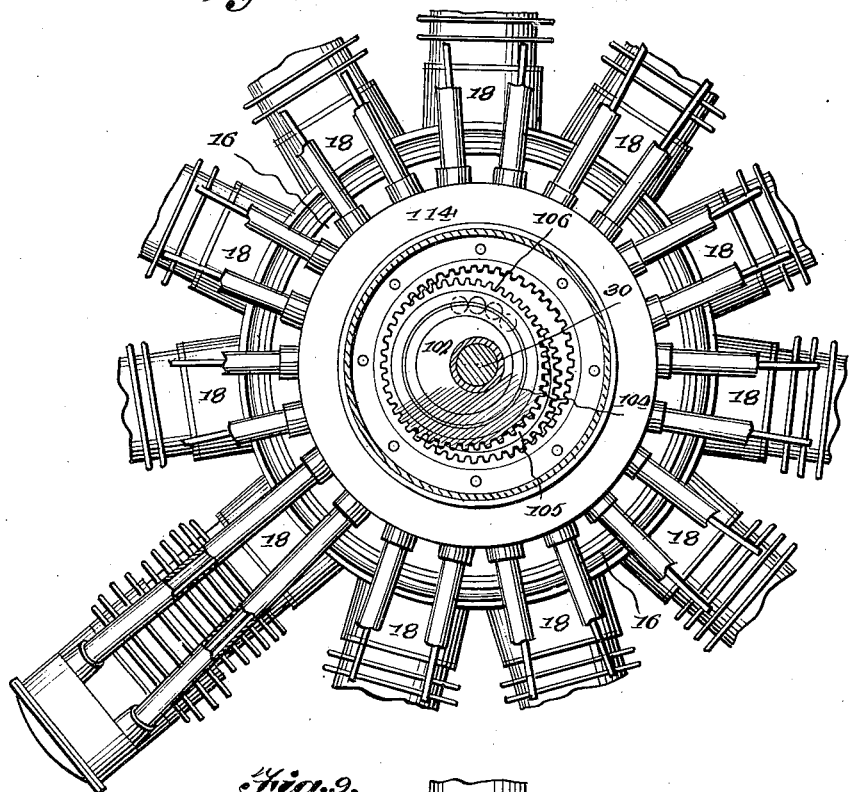
Figure 8 is a vertical sectional view of Figure 1 taken on line 8—8 thereof.
Figure 9:
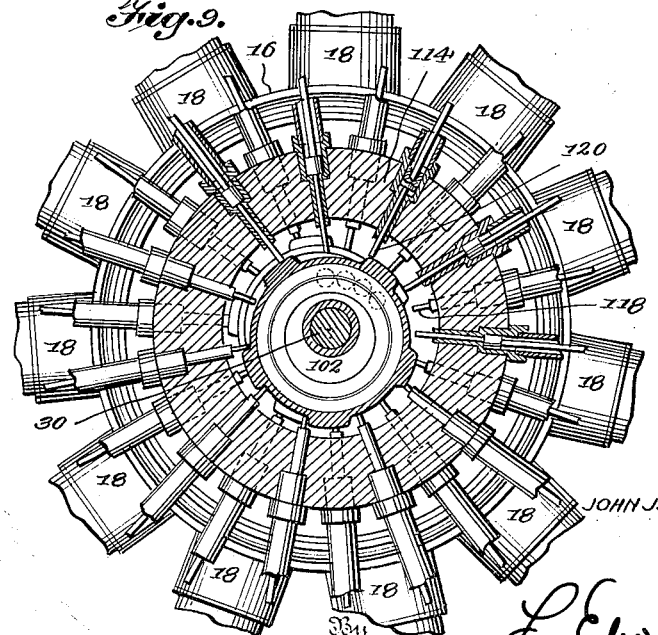
Figure 9 is a vertical sectional view of Figure 1 taken on line 9—9 thereof.

Referring now to Figures 1, and 12 to 14, inclusive, it will be seen that there is provided a novel structure for operating the intake and exhaust valves of the engine and effecting a proper timing thereof. On one of the sleeves of one of the rotating disks 32, on the left side of the internal combustion engine, there is fixedly secured a pair of spaced centrally mounted eccentrics 100 and 102. As clearly shown in Figure 14 a roller bearing 104 is fitted over the periphery of each eccentric, and mounted on the roller bearings there are gear wheels 105 and 106 having integral on one side thereof a plurality of spaced cams 108. It will be observed that the gears 105 and 106 are identical and similarly mounted on the eccentric 100 and 102. The gear 105 as clearly illustrated in Figure 1 cooperates with a stationary gear 109 securely fastened to the casing by means of bolts 110, the cam surface of the gear being disposed outwardly. The gear 106 in a similar manner cooperates with the stationary gear 112, the cam surfaces of this gear being disposed inwardly. It will be observed from Figure 14 that the eccentrics 100 and 102 which are securely fastened to the sleeve 34 may be set at any relative angle to effect a proper timing of the intake and exhaust valves. This angle has been found to be between 80 and 90 degrees with each other. As clearly illustrated in Figures 8 and 12 within the casing between the gears 108 and 112 there is securely fastened a ring 114 having a plurality of radially disposed bores therein for the reception of push rods 118 and 120. Each cylinder is provided with a pair of push rods, one for the intake valve and one for the exhaust valve, the push rod in the usual manner being adapted to be actuated by means of the cams 108 to effect an opening and closing of the valves through the medium of a rocker arm 121. It will thus be seen that upon rotation of the rotary disk member 32, and consequently a rotary movement of its sleeve 34 the eccentrics 100 and 102 which are keyed thereto will be revolved effecting a rotary and eccentric movement of the cams on the gears 105 and 106 to periodically open and close in a successive manner the valves of the cylinders. It will be seen that this mechanism while of a simple and compact arrangement is such that it will operate with any gear ratio or reduction used between the central gyrating body or ring and the main central shaft.

Figure 10:
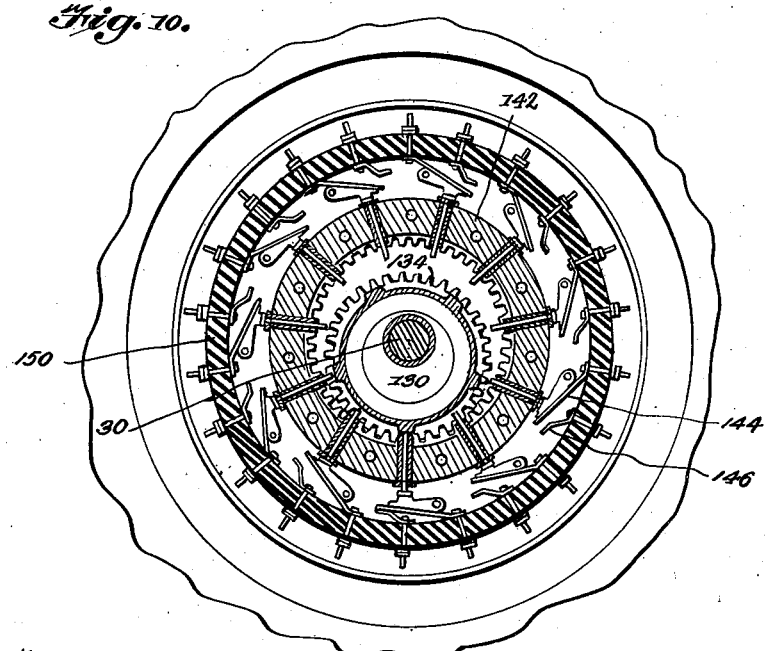
Figure 10 is a vertical sectional view of Figure 1 taken on line 10—10 thereof showing the cams and gears for the timing mechanism.
Figure 11:
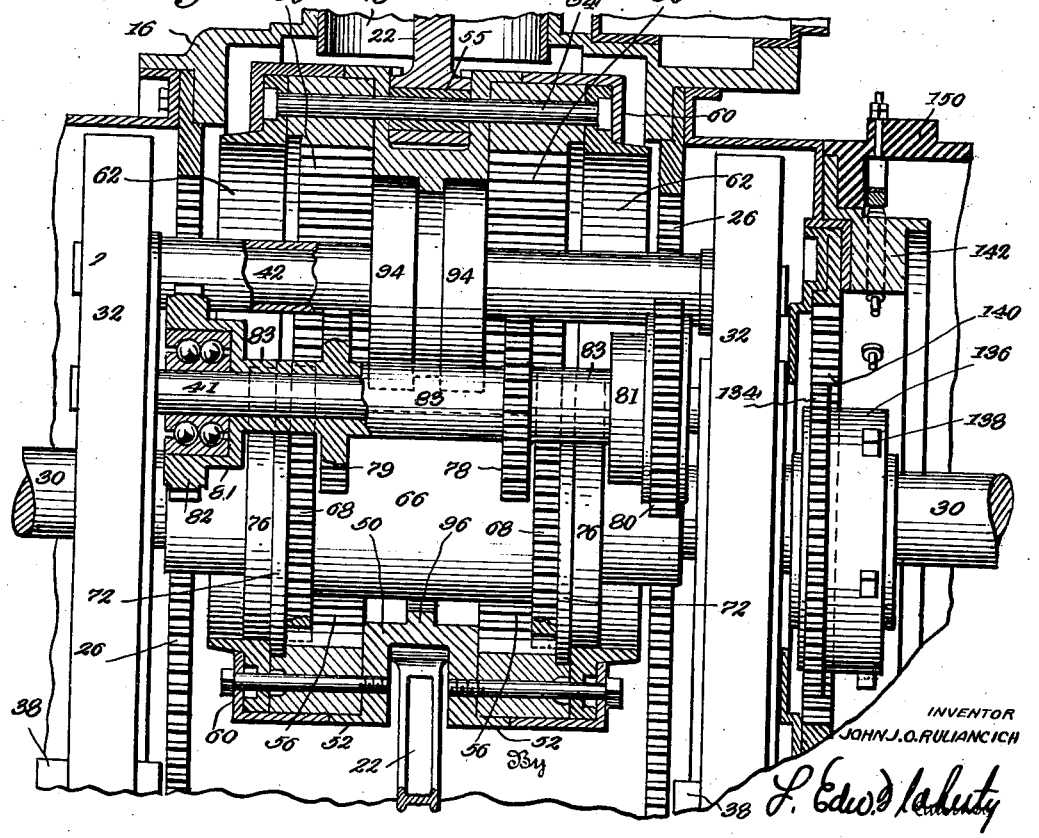
Figure 11 is an enlarged side elevational view partly in section of the rotating frame.

In a similar manner on the opposite side of the internal combustion engine, and on the sleeve of the other rotary disk 32, as illustrated in Figures 1, 10 and 11, there is fixedly secured an eccentric 130 on which there is rotatably mounted through the medium of bearings 132 and gear 134 having an integral shoulder 136 provided with a plurality of spaced cam surfaces 138. An eccentric and rotary movement of the gear 134 is effected through the cooperation of a stationary gear 140 secured to the casing of the internal combustion engine. Adjacent the ring 140 there is securely fastened a ring 142 having a plurality of insulated actuating rods therein which cooperate with the resiliently mounted movable contact members 144 which upon outward movement contact their associated electrical contacts 146. The movable contacts 144 and their associate stationary electrical contacts 146 are disposed on the inner periphery of an insulated ring 150. It will be observed from Figure 10 that there are eleven pairs of contacts, one for each cylinder of the internal combustion engine, and upon rotary movement of the rotary disk 32 the gear 134 will move rotary and eccentrically causing the cam surfaces 138 to timely engage the push rods to open and close at a predetermined time the associated electrical contacts to effect a firing of the cylinders.

It is not thought necessary to show diagrammatically the electrical connection of the high tension coil 150 to the electrical contact and the spark plugs, nor the manner in which the electrical current is supplied thereto.

Obviously any type of carbureter may be employed to supply the cylinders with the proper mixture and it is not thought necessary to go into detail with respect to such structure. However, as shown in Figure 3 the intake and exhaust valves are arranged in the upper portion of the cylinder, and the intake and exhaust communicate therewith respectively through the chambers 152 and 154.

While there is shown for the purpose of illustration a preferred embodiment of the invention, it is to be specifically understood that it is capable of various changes and modifications without departing from the spirit and scope thereof, and it is intended therefore, that only such limitations shall be imposed thereon, as are indicated in the prior art or in the appended claims.

What is claimed is:—

1. In a radial engine having a casing including a plurality of radially disposed cylinders, pistons in each of said cylinders, a transversely disposed main shaft in said casing, and transmission means between the pistons and the main shaft comprising, a pair of spaced pinions keyed to the said shaft, a gyrating frame in said casing, connecting rods pivotally connected to said gyrating frame and said pistons, a pair of spaced ring gears in said gyrating frame engaging the pinions on said main shaft, a rotating disk on said main shaft having a counterweight thereon, and means for driving said rotating disk through said ring gears.

2. In a radial engine having a casing including a plurality of radially disposed cylinders, pistons in each of said cylinders, a transversely disposed main shaft in said casing, transmission means between the pistons and the main shaft comprising a pair of spaced pinions keyed to said shaft and, a gyrating frame in said casing, connecting rods pivotally connected to said gyrating frame, a pair of spaced ring gears in said gyrating frame engaging the pinions on said main shaft, a stationary ring gear secured to said casing adjacent the gyrating frame, a rotating disk on said main shaft having a counterweight thereon, and means for driving said rotating disk through said ring gears in said gyrating frame and the stationary ring gear.

3. In a radial engine having a casing including a plurality of radially disposed cylinders, pistons in each of said cylinders, a transversely disposed main shaft in said casing and, transmission means between the pistons and the shaft comprising, a pair of spaced pinions keyed to said shaft, a gyrating frame in said casing, connecting rods connecting said pistons to said gyrating frame, a pair of spaced ring gears in said gyrating frame engaging the pinions on said main shaft, a stationary ring gear secured to said casing adjacent the gyrating frame, a rotating disk on said main shaft having a counterweight thereon, a pair of spaced transversely extending countershafts secured to said rotating disk, each of said countershafts having a pair of spaced integral pinion gears thereon, the pinion gears on said countershafts engaging one of the ring gears and the stationary ring gear.

4. In a radial engine having a casing including a plurality of radially disposed cylinders, pistons in each of said cylinders, a transversely disposed main shaft in said casing and, transmission means between the pistons and the shaft comprising, a pair of spaced integral pinions keyed to said shaft, a gyrating frame in said casing, connecting rods pivotally connecting said frame to the pistons, a pair of spaced ring gears fixedly secured in said gyrating frame and engaging the pinions on said main shaft, a stationary ring gear secured to said casing adjacent each side of said gyrating frame, a rotating disk on said main shaft on each side of said stationary ring gears, counterweights on each of said disks, and gear means for driving said disks through said ring gears in said gyrating frame and the stationary ring gears.

5. In a radial engine having a casing including a plurality of radially disposed cylinders, pistons in each of said cylinders, a transversely disposed main shaft in said casing and, transmission means between the pistons and the shaft comprising, a pair of spaced integral pinions keyed to said shaft, a gyrating frame in said casing, connecting rods pivotally connecting said frame to the pistons, a pair of spaced ring gears fixedly secured in said gyrating frame and engaging the pinions on said main shaft, a stationary ring gear adjacent each side of the gyrating frame and secured to said casing, a rotating disk on said main shaft on each side of said stationary ring gears, counterweights on each of said rotating disks, a pair of spaced countershafts extending through said gyrating frame and connecting said disks, and gears on said countershafts cooperating with the ring gears for driving said disks.

6. In a radial engine having a casing including a plurality of radially disposed cylinders, pistons in each of said cylinders, a transversely disposed main shaft in said casing and, transmission means between the pistons and the shaft comprising, a pair of spaced integral pinions keyed to said shaft, a gyrating frame in said casing, connecting rods pivotally connecting said frame to the pistons, a pair of spaced ring gears fixedly secured in said gyrating frame and engaging the pinions on said main shaft, a stationary ring on each side of said gyrating frame secured to said casing, a rotating disk on said main shaft on each side of said stationary ring gears, counterweights on each of said disks, a pair of spaced countershafts extending through said gyrating frame and connecting said disks, said countershafts being oppositely disposed to the counterweights on said disks, each of said countershafts having thereon a pair of integral spaced gears respectively engaging one of the ring gears in the gyrating frame, and one of the stationary ring gears, and means for limiting the eccentric movement of said gyrating frame.

JOHN J. O. RULIANCICH.